US007761419B2

(12) United States Patent
Wray (10) Patent No.: US 7,761,419 B2
(45) Date of Patent: Jul. 20, 2010

(54) PROTECTED DATA REPLICATION

(75) Inventor: John C. Wray, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 11/321,543

(22) Filed: Dec. 29, 2005

(65) Prior Publication Data

US 2007/0156788 A1 Jul. 5, 2007

(51) Int. Cl.
*G06F 7/00* (2006.01)
*G06F 15/16* (2006.01)
(52) U.S. Cl. .................... 707/634; 709/227
(58) Field of Classification Search .............. None
See application file for complete search history.

(56) References Cited

U.S. PATENT DOCUMENTS

| 5,812,793 | A * | 9/1998 | Shakib et al. ............... 709/201 |
| 5,991,399 | A * | 11/1999 | Graunke et al. .............. 380/279 |
| 6,321,236 | B1 * | 11/2001 | Zollinger et al. ............ 707/203 |
| 6,438,548 | B1 * | 8/2002 | Grim et al. ..................... 707/8 |
| 6,748,381 | B1 * | 6/2004 | Chao et al. ..................... 707/10 |
| 6,836,845 | B1 | 12/2004 | Lennie et al. |
| 6,898,618 | B1 | 5/2005 | Slaughter et al. |
| 2001/0025256 | A1 * | 9/2001 | Oliphant et al. ............... 705/26 |
| 2002/0124055 | A1 * | 9/2002 | Reisman ..................... 709/218 |
| 2003/0009365 | A1 * | 1/2003 | Tynan et al. ..................... 705/9 |
| 2003/0023618 | A1 * | 1/2003 | Orbits et al. ................ 707/203 |
| 2003/0204613 | A1 * | 10/2003 | Hudson et al. .............. 709/231 |
| 2004/0003389 | A1 * | 1/2004 | Reynar et al. ............... 717/178 |
| 2004/0054987 | A1 * | 3/2004 | Sonpar et al. ............... 717/120 |
| 2004/0117666 | A1 | 6/2004 | Lavender et al. |
| 2004/0181557 | A1 * | 9/2004 | Orbits et al. ................ 707/200 |
| 2005/0131997 | A1 * | 6/2005 | Lewis et al. .................. 709/203 |
| 2006/0130046 | A1 * | 6/2006 | O'Neill ....................... 717/168 |

(Continued)

OTHER PUBLICATIONS

Kallahalla, M. et al., "Plutus: Scalable secure file sharing on untrusted storage". Proceedings of the 2nd Conference on File and Storage Technologies (FAST'03), pp. 29-42 (Mar. 31-Apr. 2, 2003, San Francisco, CA). Published by USENIX, Berkeley, CA.

(Continued)

*Primary Examiner*—Neveen Abel Jalil
*Assistant Examiner*—Tarek Chbouki
(74) *Attorney, Agent, or Firm*—Daniel McLoughlin; Hoffman Warnick LLC (57) ABSTRACT

A solution for replicating protected data is provided. A manifest is managed along with the protected data at each computing device as well as at a server. The manifest is also protected and includes an entry for each protected data item in the protected data. The protected data at each computing device is replicated using both the local version of the manifest and the server version of the manifest. In an embodiment, each entry in the manifest includes an update identifier that can be compared with an update identifier stored with the protected data item as well as the update identifier in a local version of the manifest. In another embodiment, the manifest includes an entry for each computing device that includes a replication identifier. These entries can be used to perform additional checks to ensure that the manifest and/or protected data has not been compromised.

20 Claims, 3 Drawing Sheets

U.S. PATENT DOCUMENTS

2007/0220107 A1* 9/2007 Reisman .................. 709/217

OTHER PUBLICATIONS

Li, J. et al., "Secure Untrusted Data Repository (SUNDR)". 6th USENIX OSDI Symposium 2004 on Operating Systems Design and Implementation, pp. 121-136.

Maheshwari, U. et al., "How to Build a Trusted Database System on Untrusted Storage". 4th USENIX OSDI Symposium 2000, pp. 135-150 of the *Proceedings*.

Popescu, B. et al., "Secure Data Replication over Untrusted Hosts". USENIX—HotOS IX—Ninth Workshop on Hot Topics in Operating Systems, May 18-21, 2003, Kauai Marriott Resort & Beach Club, Lihue, Hawaii.

\* cited by examiner

PROTECTED DATA REPLICATION

FIELD OF THE INVENTION

The invention relates generally to replicating protected data, and more particularly, to a solution for replicating protected data using a manifest stored with the protected data on a server.

BACKGROUND OF THE INVENTION

In a network environment, it is frequently desirable to share data between two or more computing devices. For example, in a client-server environment in which users have clients (e.g., computing devices) that access a centralized server, there is a need to support those users who regularly use multiple clients. In this case, it is desirable to share information on a user's state between each client that the user uses. However, state information is typically divided between the server and the client. In particular, in order to support off line use of the client, the state information to which the user will require access when the server is not available is generally stored at the client. As a result, when the user changes from one client to another, the portion of the state information that is local to the first client is not available on the second.

One solution is to maintain a copy of the state information stored on the client on the server, and use a replication mechanism to ensure that the server copy is kept in synchronization with changes that are made on each client and vice versa. For example, when a user begins using a new client, the state information on the new client is initialized using the server copy. Similarly, when the user modifies one or more data items in the state information, the server copy is synchronized with the modified state information. In this manner, the state information on multiple clients can remain synchronized using the server copy.

An important part of each user's state information is the security credentials, such as cryptographic key(s), certificate(s), password(s), and/or the like. Typically, some security credentials are considered extremely sensitive and should be closely protected. For example, a private key that is used to sign the user's email is generally considered a sensitive key, since its compromise would enable another to impersonate the user. Therefore, such security credential(s) frequently are encrypted, e.g., using a pass phrase known only to the user, when replicated using the server. This substantially reduces the likelihood that the security credential(s) can be successfully stolen and/or modified by another party, such as a server administrator.

A goal in designing a protocol for the replication is to minimize an amount of data that is exchanged between the client and server. To this extent, it is desirable that a replication protocol only require the transmission of those security credential(s) that changed since the last replication. However, if multiple security credentials are encrypted as a single blob, individual credentials cannot be exchanged between the server and client (only the entire blob may be exchanged). On the other hand, when each security credential is encrypted and stored individually, another party with access to the server may remove a security credential or replace it with an earlier instance without detection. Since some security credentials may represent statements of trust (or distrust), this is an undesirable vulnerability.

In view of the foregoing, there exists a need in the art to overcome one or more of the deficiencies indicated herein.

BRIEF SUMMARY OF THE INVENTION

The invention provides a solution for replicating protected data. A manifest is managed along with the protected data at each computing device as well as at a server. The manifest is also protected and includes an entry for each protected data item in the protected data. The protected data at each computing device is replicated using both the local version of the manifest and the server version of the manifest. In an embodiment, each entry in the manifest includes an update identifier that can be compared with an update identifier stored with the protected data item as well as the update identifier in a local version of the manifest. In another embodiment, the manifest includes an entry for each computing device that includes a replication identifier. These entries can be used to perform additional checks to ensure that the manifest and/or protected data has not been compromised.

A first aspect of the invention provides a method of replicating protected data, the method comprising: obtaining a local version of a manifest for a set of protected data items, the manifest including an identifier for each protected data item and a corresponding update identifier for the protected data item; obtaining a server version of the manifest from a server; and replicating the set of protected data items using the local version of the manifest and the server version of the manifest.

A second aspect of the invention provides a system for replicating protected data, the system comprising: a system for obtaining a local version of a manifest for a set of protected data items, the manifest including an identifier for each protected data item and a corresponding update identifier for the protected data item; a system for obtaining a server version of the manifest from a server; and a system for replicating the set of protected data items using the local version of the manifest and the server version of the manifest.

A third aspect of the invention provides a program product stored on a computer-readable medium, which when executed, enables a computer infrastructure to replicate protected data, the program product comprising computer program code for enabling the computer infrastructure to: obtain a local version of a manifest for a set of protected data items, the manifest including an identifier for each protected data item and a corresponding update identifier for the protected data item; obtain a server version of the manifest from a server; and replicate the set of protected data items using the local version of the manifest and the server version of the manifest.

A fourth aspect of the invention provides a method of generating a system for replicating protected data, the method comprising: providing a computer infrastructure operable to: obtain a local version of a manifest for a set of protected data items, the manifest including an identifier for each protected data item and a corresponding update identifier for the protected data item; obtain a server version of the manifest from a server; and replicate the set of protected data items using the local version of the manifest and the server version of the manifest.

A fifth aspect of the invention provides a business method for replicating protected data, the business method comprising managing a computer infrastructure that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for replicating protected data. A manifest is managed along with the protected data at each computing device as well as at a server. The manifest is also protected and includes an entry for each protected data item in the protected data. The protected data at each computing device is replicated using both the local version of the manifest and the server version of the manifest. In an embodiment, each entry in the manifest includes an update identifier that can be compared with an update identifier stored with the protected data item as well as the update identifier in a local version of the manifest. In another embodiment, the manifest includes an entry for each computing device that includes a replication identifier. These entries can be used to perform additional checks to ensure that the manifest and/or protected data has not been compromised. As used herein, unless otherwise noted, the term "set" means one or more (i.e., at least one).

Figure 1:
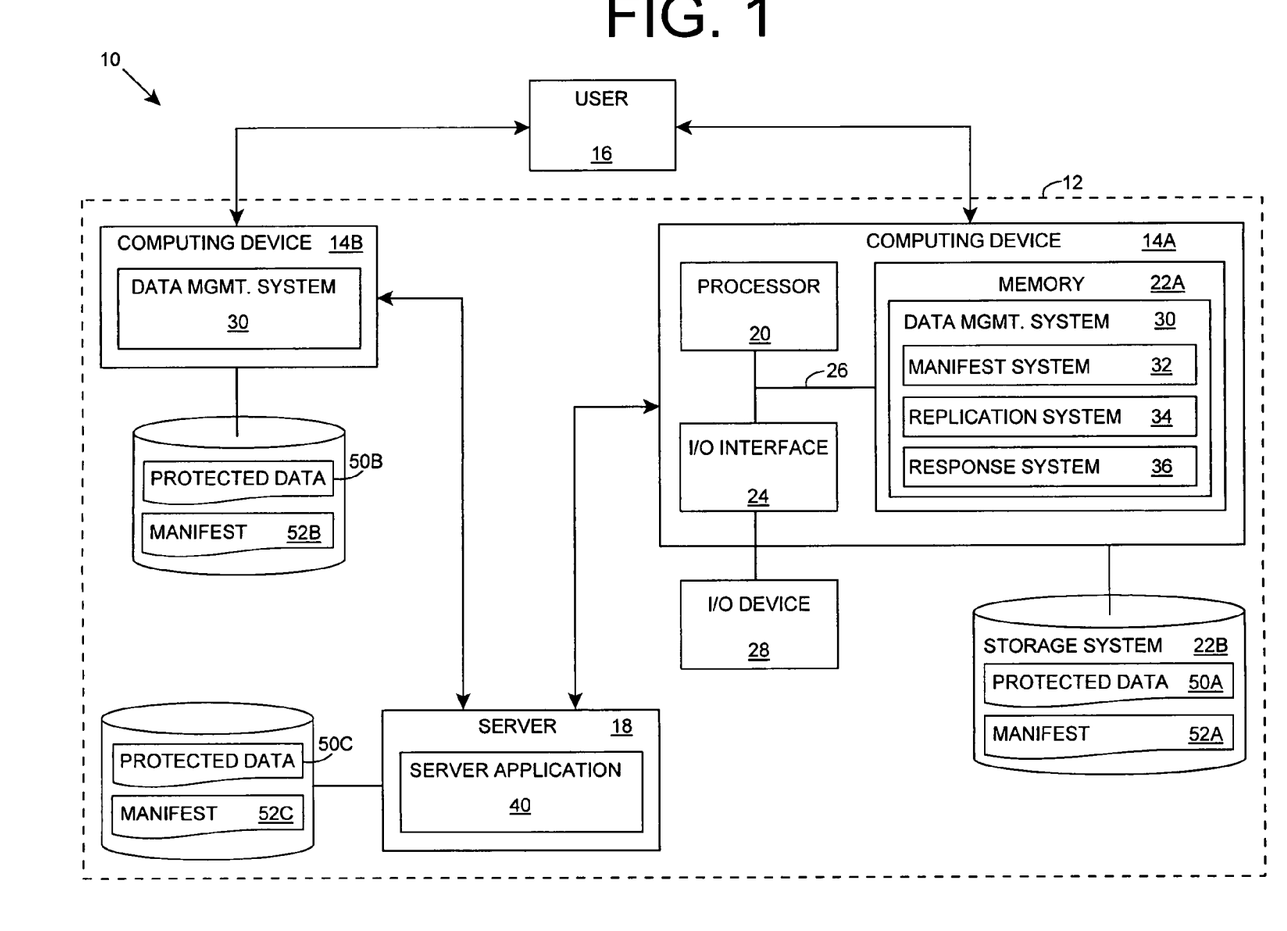
FIG. 1 shows an illustrative environment for replicating protected data according to an embodiment of the invention.

Turning to the drawings, FIG. 1 shows an illustrative environment 10 for replicating protected data according to an embodiment of the invention. To this extent, environment 10 includes a computer infrastructure 12 that can perform the process described herein in order to replicate protected data 50A-B. In particular, computer infrastructure 12 is shown including computing devices 14A-B, each of which comprises a data management (mgmt.) system 30, which makes each computing device 14A-B operable to replicate protected data 50A-B using a copy of the protected data 50C stored at server 18, by performing the process described herein.

Computing device 14A is shown including a processor 20, a memory 22A, an input/output (I/O) interface 24, and a bus 26. Further, computing device 14A is shown in communication with an external I/O device/resource 28 and a storage system 22B. As is known in the art, in general, processor 20 executes computer program code, such as data management system 30, which is stored in memory 22A and/or storage system 22B. While executing computer program code, processor 20 can read and/or write data, such as protected data 50A, to/from memory 22A, storage system 22B, and/or I/O interface 24. Bus 26 provides a communications link between each of the components in computing device 14A. I/O device 28 can comprise any device that enables an individual, e.g., user 16, to interact with computing device 14A or any device that enables computing device 14A to communicate with one or more other computing devices, such as server 18, using any type of communications link. The communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. It is understood that computing device 14B and/or server 18 each can comprise the same components (processor, memory, I/O interface, etc.) as shown for computing device 14A. These components have not been separately shown and discussed for brevity.

In any event, each computing device 14A-B and/or server 18 can comprise any general purpose computing article of manufacture capable of executing computer program code installed thereon (e.g., a personal computer, server, handheld device, etc.). However, it is understood that computing device 14A-B and data management system 30 are only representative of various possible equivalent computing devices that may perform the process described herein. To this extent, in other embodiments, the functionality provided by computing device 14A-B and data management system 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 can comprise any number of computing devices 14A-B. Further, each computing device 14A-B and/or server 18 can comprise two or more computing devices (e.g., a server cluster) that communicate over any type of communications link, such as a network, a shared memory, or the like, to perform the process described herein. Further, while performing the process described herein, one or more computing devices in computer infrastructure 12 can communicate with one or more other computing devices external to computer infrastructure 12 using any type of communications link.

As discussed herein, data management system 30 enables computer infrastructure 12 to replicate protected data 50A-B. To this extent, data management system 30 is shown including a manifest system 32, a replication system 34, and a response system 36. Operation of each of these systems is discussed further herein. However, it is understood that some of the various systems shown in FIG. 1 can be implemented independently, combined, and/or stored in memory for one or more separate computing devices that are included in computer infrastructure 12. Further, it is understood that some of the systems and/or functionality may not be implemented, or additional systems and/or functionality may be included as part of computer infrastructure 12.

Figure 2:
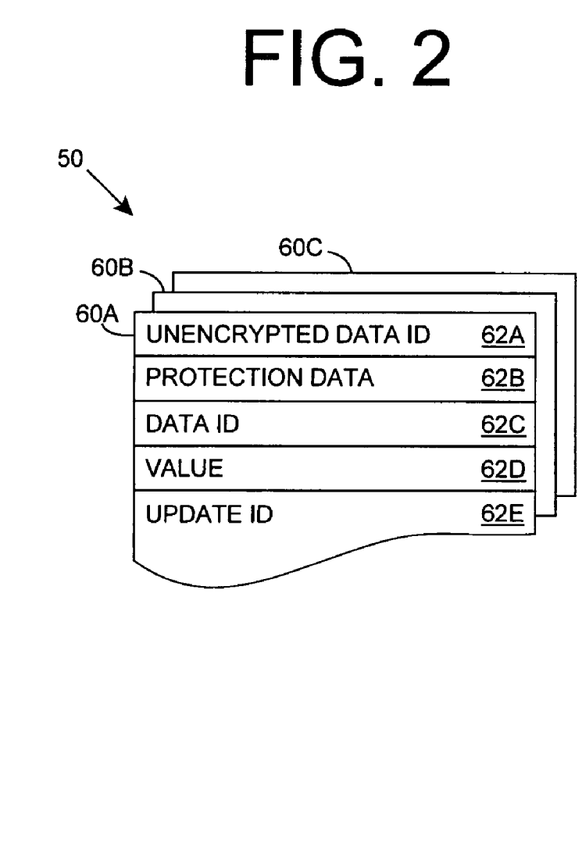
FIG. 2 shows illustrative protected data according to an embodiment of the invention.

Regardless, the invention provides a solution for replicating protected data 50A-C. FIG. 2 shows illustrative protected data 50 according to an embodiment of the invention. Protected data 50 can include a set of protected data items 60A-C. Each protected data item, such as protected data item 60A, can include an unencrypted data identifier (ID) 62A, protection data 62B, a data identifier 62C, a value 62D, and an update identifier 62E. Data identifier 62C comprises any type of identification, such as a textual name, for the corresponding value 62D. Protection data 62B comprises data that prevents each protected data item 60A from unauthorized modification and/or unauthorized viewing/disclosure, e.g., by an administrator and/or application accessing protected data 50C (FIG. 1) stored at server 18 (FIG. 1). For example, protection data 62B can comprise data that is required for data management system 30 (FIG. 1) at each computing device 14A-B (FIG. 1) to encrypt/decrypt the corresponding protected data item 60A. In this manner, each protected data item 60A can be separately encrypted and/or stored from other protected data items 60B-C, thereby enabling each protected data item 60A-C to be individually obtained from server 18, and individually written, modified, read, and/or the like, by each data management system 30. Unencrypted data identifier 62A is an unencrypted version of data identifier 62C, which can enable server 18 to identify and provide the correct protected data item 60A-C for processing on computing devices 14A-B. Prior to encryption, data identifier 62C and/or value 62D can be stored in any format, such as binary, text, and/or the like. Update identifier 62E can comprise any type of identifier for identifying a version of value 62D. For example, update identifier 62E could comprise a timestamp for the last modification of value 62D, a sequential number that is incremented each time value 62D is changed, an identifier of a client that made the change, and/or the like.

Returning to FIG. 1, each computing device 14A-B includes a data management system 30 for managing a local copy of protected data 50A-B, respectively. Data management system 30 can comprise an application, a portion of an operating system, and/or the like, which is used by one or more other applications to manage protected data 50A-B for each user 16, a portion of an application that manages user-specific protected data 50A-B for the application, and/or the like. In any event, as user 16 uses each computing device 14A-B and/or one or more applications executing on computing device 14A-B, data management system 30 can read, write, add, delete, modify, and/or the like, one or more data items 60A-C (FIG. 2) to/from protected data 50A-B.

In one embodiment, protected data 50A-B comprises some or all of the state information for a particular user 16 (FIG. 1). To this extent, protected data 50A-B can comprise security credentials for user 16, such as cryptographic key(s), certificate(s), password(s), and/or the like. Further, protected data 50A-B can comprise data that enables user 16 to interact with one or more other computing devices, such as server 18 (FIG. 1). For example, protected data 50A-B can comprise one or more passwords that enables user 16 to access server application 40.

Figure 3:
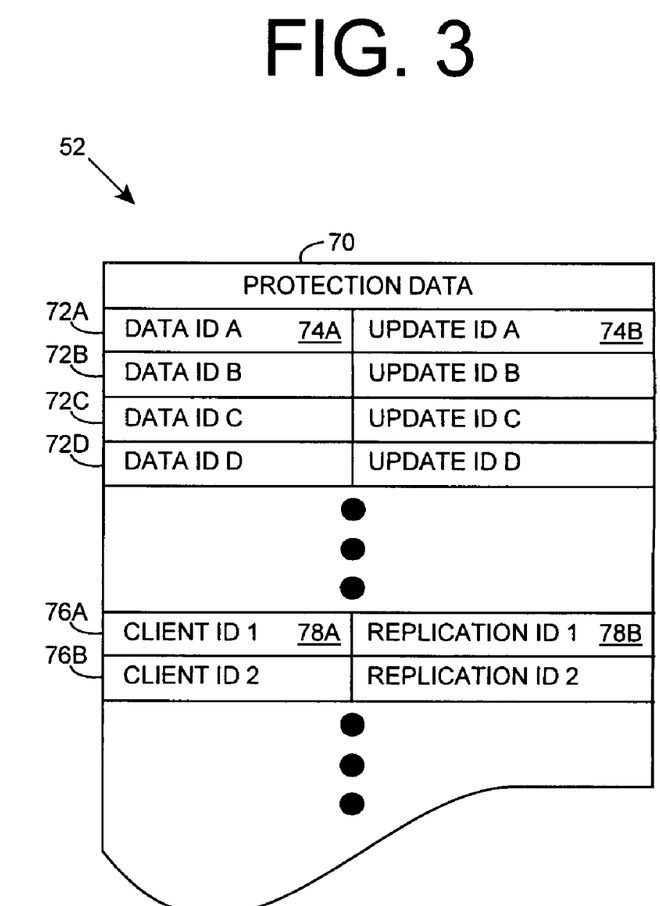
FIG. 3 shows an illustrative manifest according to an embodiment of the invention.

Frequently, user 16 will desire to use multiple computing devices 14A-B. To this extent, data management system 30 can replicate protected data 50A-B on each computing device 14A-B that user 16 uses. In replicating protected data 50A-B, data management system 30 uses a manifest 52A-C. FIG. 3 shows an illustrative manifest 52 according to an embodiment of the invention. Manifest 52 is shown including protection data 70, which enables manifest 52 to be protected from unauthorized modification. To this extent, protection data 70 can comprise information that enables manifest 52 to be encrypted/decrypted (e.g., a public key), a digital signature, a message authentication code (MAC), and/or the like.

Additionally, manifest 52 includes a set of data item entries 72A-D. Each data item entry, such as data item entry 72A, includes a data item identifier 74A and a corresponding update identifier 74B. Data item identifier 74A can comprise any type of data that uniquely identifies a data item 60A-C (FIG. 2) and/or the corresponding data identifier 62C (FIG. 2) in protected data 50 (FIG. 2). To this extent, data item identifier 74A could comprise the same data as the corresponding data identifier 62C in protected data 50. Further, update identifier 74B comprises any type of data, such as a timestamp, which identifies the last modification to the protected data item 60A-C identified by data item identifier 74A. To this extent, update identifier 74B can compromise the same data as the corresponding update identifier 62E (FIG. 2) in protected data 50. In this manner, each data item entry 72A-D in manifest 52 can be used to identify when and which protected data item 60A-C has been modified.

Manifest 52 also can include a set of client entries 76A-B. Each client entry, such as client entry 76A, can include a client identifier 78A and a corresponding replication identifier 78B. Client identifier 78A can comprise any type of data, e.g., a computer name, a network address, and/or the like, which uniquely identifies each computing device 14A-B (FIG. 1) on which manifest 52 is replicated. Replication identifier 78B can comprise any data that identifies an update version and/or time of update, e.g., a timestamp associated with the last replication that took place on the corresponding client.

Figure 4:
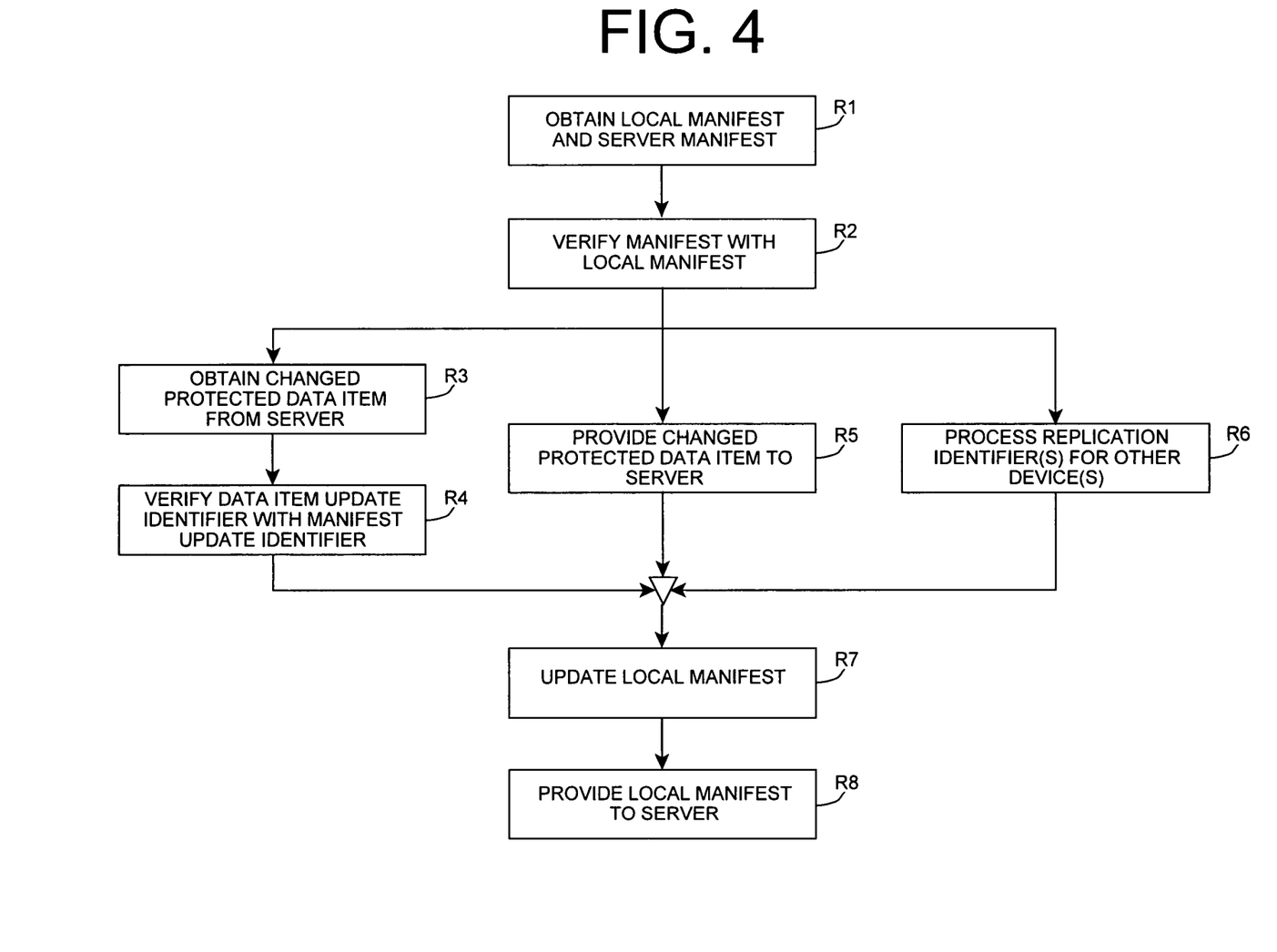
FIG. 4 shows an illustrative process for replicating protected data according to an embodiment of the invention.

FIG. 4 shows an illustrative process for replicating protected data 50A-B (FIG. 1), which can be implemented by computing infrastructure 12 (FIG. 1), according to an embodiment of the invention. Referring to FIGS. 1 and 4, and computing device 14A in particular, in step R1, manifest system 32 can obtain a local version of manifest 52A for protected data 50A and a server version of manifest 52C from server 18. Manifest 52C can be stored as a single unit of protected data (e.g., a blob) at server 18. In this manner, since manifest 52C is protected from unauthorized modification, manifest 52C only can be replaced in its entirety, and individual data entries in manifest 52C cannot be modified or obtained independently.

Replication system 34 can replicate protected data 50A using manifest 52A and manifest 52C. To this extent, in step R2, replication system 34 can verify manifest 52C with manifest 52A. For example, replication system 34 can compare the replication identifiers 78B (FIG. 3) in each manifest 52A, 52C that correspond to computing device 14A. Similarly, replication system 34 can compare the corresponding replication identifiers 78B for each client identifier 78A (FIG. 3) in each manifest 52A, 52C. Regardless, when manifest 52A includes a newer replication identifier 78B than manifest 52C, then manifest 52C is invalid. In this case, response system 36 can initiate a response as discussed herein.

When replication system 34 determines that manifest 52C is likely valid, e.g., the replication identifier(s) 78B in manifest 52C all indicate the same or a more recent version than those in manifest 52A, replication system 34 can compare the corresponding update identifiers 74B in each version of manifest 52A, 52C. Subsequently, replication system 34 can perform one or more alternative actions based on the comparison. In particular, when the corresponding update identifiers 74B are identical, replication system 34 does not need to take any further action since the local protected data item 60A-B (FIG. 2) is the same version as the protected data item 60A-B stored in the protected data 50C at server 18.

However, when manifest 52A includes an update identifier 74B (FIG. 3) that is older than the corresponding update identifier 74B in manifest 52C, then the corresponding protected data item, such as protected data item 60A (FIG. 2), was changed by another computing device, such as computing device 14B. In this case, in step R3, replication system 34 can obtain the changed protected data item 60A from server 18. In particular, replication system 34 can request the server version of protected data item 60A. In response, server 18 can provide the protected data item 60A from its protected data 50C to computing device 14A. However, should server 18 respond that the requested protected data item 60A is not available, then the protected data 50C and manifest 52C at server 18 do not match. For example, protected data item 60A may have been removed from protected data 50C without authorization. In this case, response system 36 can initiate a response as described herein.

After receiving the protected data item 60A (FIG. 2) from server 18, then in step R4, replication system 34 can verify that the protected data item 60A corresponds to the version listed in manifest 52C. In particular, replication system 34 can compare the unencrypted data identifier 62A (FIG. 2) with the encrypted data identifier 62C to ensure that the encrypted data in data item 60A matches the unencrypted data identifier 62A. If the two data identifiers 62A, 62C do not match, then data item 60A is invalid (e.g., unencrypted data identifier 62A may have been changed without authorization) and response system 36 can initiate a response as described herein. When both data identifiers 62A, 62C match, replication system 34 also can compare the update identifier 62E (FIG. 2) for the protected data item 60A obtained from server 18 with the update identifier 74B (FIG. 3) for the corresponding data item entry 72A (FIG. 3) in manifest 52C. Should both update identifiers 62E, 74B match, then the protected data item 60A is the correct version, and the local version of the protected data item 60A can be updated accordingly. Otherwise, the manifest 52C and protected data 50C at server 18 do not match. For example, an older version of protected data item 60A may have been written to protected data 50C without authorization. In this case, response system 36 can initiate a response as described herein.

Alternatively, manifest 52A may include an update identifier 74B (FIG. 3) that is newer than the corresponding update identifier 74B in manifest 52C, i.e., the update identifier 74B in manifest 52C corresponds to an earlier version than the update identifier 74B in manifest 52A. In this case, the corresponding protected data item, such as protected data item 60A (FIG. 2), was changed at computing device 14A. To this extent, in step R5, replication system 34 can provide the changed protected data item 60A for storage at server 18.

It is understood that one or more steps R3-5 may not be performed or may be repeated any number of times in order to replicate all data, such as protected data items 60A-B (FIG. 2), in protected data 50A. Further, it is understood that one or more protected data items 60A-B may have been deleted from protected data 50A or 50C and/or added to protected data 50A or 50C by an authorized user 16. In any of these situations, manifest 52A will have an additional (when added locally or deleted remotely) or a missing (when deleted locally or added remotely) data item entry 72A (FIG. 3) than manifest 52C. As a result, replication system 34 can delete and/or add (obtain or provide) the particular protected data item(s) 60A-B from/to the corresponding protected data 50A, 50C.

In step R6, replication system 34 can process the replication identifiers 78B (FIG. 3) for other computing devices 14B. For example, replication system 34 can replace any older replication identifiers 78B in manifest 52A with a newer replication identifier 78B, add/delete any client entries 76A-B (FIG. 3) to/from manifest 52A, and/or the like. Further, when replication identifier 78B indicates a time, replication system 34 can determine when another computing device 14B last updated manifest 52C. If one or more other computing devices 14B has not been updating manifest 52C for at least a threshold time period (e.g., "X" number of days), it could be an indication that server 18 is maintaining distinct copies of manifest 52C for each computing device 14A-B. In this case, response system 36 can initiate a response as described herein.

In step R7, replication system 34 can update the local version of manifest 52A. For example, for each protected data item 60A-B (FIG. 2) that changed in protected data 50A, replication system 34 can update manifest 52A to reflect the change (e.g., update the corresponding update identifier 74B (FIG. 3), add/remove a corresponding data item entry 72A-B (FIG. 3), and/or the like). Further, replication system 34 can update the corresponding replication identifier 78B (FIG. 3) in manifest 52A-B each time manifest 52C is obtained and checked for changed data, regardless of whether any protected data 50A, 50C is updated. In this manner, manifest 52C will continually be updated by each computing device 14A-B on which protected data 50A-B (FIG. 1) is replicated. Still further, manifest system 32 can protect manifest 52A from unauthorized modification (e.g., by encrypting, using a message authentication code (MAC), and/or the like). Subsequently, in step R8, manifest system 32 can provide manifest 52A for storage at server 18. In particular, server 18 can replace manifest 52C with manifest 52A.

Response system 36 can initiate any type of response when manifest 52C and/or protected data 50C may have been changed/deleted by an unauthorized individual. The type of response can vary based on the particular indication(s) that triggered the response and/or the particular implementation of data management system 30. For example, response system 36 could generate a message for display to user 16, could send a message to another system (e.g., an application) that uses the protected data 50A, could send a message to a network administrator, and/or the like. Further, user 16, another system, and/or the network administrator can perform one or more actions based on the indication(s). Alternatively, response system 36 can receive a request for one or more actions and/or automatically perform one or more actions. In any event, the action(s) can comprise halting use of server 18, invalidating some/all of protected data 50A and/or manifest 52A, removing one or more client entries 76A-B (FIG. 3) from manifest 52C (e.g., when the indicator is that a computing device has not updated manifest 52C for an extended period of time due to the fact that user 16 no longer uses the computing device), and/or the like.

As described herein, in order to complete the replication of protected data 50A-B at each computing device 14A-B, several transfers of data between computing device 14A-B and server 18 may be required. To this extent, replication system 34 can perform the replication using a transaction or the like, which enables the effects of a partially completed replication to be "rolled back", undone, and/or continued from a previous point. Further, access to protected data 50C and/or manifest 52C can be locked by a single computing device 14A-B during the replication. This would prevent any possibility that another computing device 14A-B would access protected data 50C and/or manifest 52C, which has only been partially replicated. However, when protected data 50C and manifest 52C are specific to a particular user 16, this may not be necessary.

Additionally, when the various identifiers discussed herein, e.g., update identifier 62E (FIG. 2) and/or replication identifier 78B (FIG. 3), comprise a timestamp, the timestamp can be used to ensure that only the most recent value 62D (FIG. 2) is stored. For example, computing device 14A may change a value 62D in protected data 50A. However, in replicating using manifest 52C, the corresponding update identifier 62E may indicate that a more recent change was made to value 62D at another computing device 14B. In this case, replication system 34 can obtain the more recent value 62D from protected data 50C rather than overwriting it with the local value 62D.

It is understood that the various steps shown and described herein are only illustrative. To this extent, one or more additional steps may be performed, one or more steps may be combined and/or removed, and/or the order of the steps may be altered. As a result, the invention is not limited to the particular illustrative process shown and described herein. For example, it is understood that when user 16 is using computing device 14A for the first time, computing device 14A will not have a manifest 52A or a local copy of protected data 50A. In this case, manifest system 32 can obtain manifest 52C and all protected data 50C from server 18 to use as a local version of manifest 52A and protected data 50A. However, replication system 34 will not be able to verify manifest 52C in step R2 or need to process replication identifiers for other devices in step R6 since manifest 52A is the same as manifest 52C.

While shown and described herein as a method and system for replicating protected data, it is understood that the invention further provides various alternative embodiments. For example, in one embodiment, the invention provides a program product stored on a computer-readable medium, which when executed, enables a computer infrastructure to replicate protected data. To this extent, the computer-readable medium includes program code, such as data management system 30 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), and/or the like.

In another embodiment, the invention provides a method of generating a system for replicating protected data. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as an application service provider, could offer to replicate protected data as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decomposition. To this extent, program code can be embodied as one or more types of program products, such as an application/software program, component software/a library of functions, an operating system, a basic I/O system/driver for a particular computing and/or I/O device, and the like.

The foregoing description of various aspects of the has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of replicating protected data, the method comprising:
obtaining a local version of a manifest for a set of protected data items, the manifest including an identifier for each protected data item and a corresponding update identifier associated with a version of the protected data item and further including a plurality of client identifiers and a corresponding replication identifier for each of the plurality of client identifiers, wherein each client identifier identifies a unique computing device on which the manifest is replicated and wherein the replication identifier is associated with a last replication of the manifest on the corresponding computing device;
obtaining a server version of the manifest from a server; and
replicating, on at least one computing device, the set of protected data items using the local version of the manifest and the server version of the manifest, the replicating including comparing the replication identifiers for each of the plurality of client identifiers in the local version and server version of the manifest to verify a validity of the server version of the manifest.

2. The method of claim 1, further comprising:
updating the replication identifier corresponding to a client identifier for a client in the local version of the manifest;
protecting the manifest from an unauthorized modification; and
providing the manifest for storage at the server.

3. The method of claim 1, further comprising:
comparing a replication identifier in the local version of the manifest to a corresponding replication identifier in the server version of the manifest; and
initiating a response when the replication identifier in the local version of the manifest is newer than the replication identifier in the server version of the manifest.

4. The method of claim 1, further comprising:
determining when another client last updated the server version of the manifest; and
initiating a response when the another client has not updated the manifest for at least a threshold time period.

5. The method of claim 1, the replicating including comparing an update identifier corresponding to a protected data item in the local version of the manifest to an update identifier corresponding to the protected data item in the server version of the manifest.

6. The method of claim 5, the replicating further including, requesting a server version of the protected data item when the update identifier in the local version of the manifest is older than the update identifier in the server version of the manifest.

7. The method of claim 6, the replicating further including:
obtaining the server version of the protected data item; and
updating a local version of the protected data item based on the server version of the protected data item.

8. The method of claim 7, the replicating further including:
comparing an update identifier in the obtained protected data item with the update identifier in the server version of the manifest; and
initiating a response when the update identifiers are different.

9. The method of claim 6, the replicating further including initiating a response when the protected data item is not available on the server.

10. The method of claim 5, the replicating including providing the local protected data item for storage at the server when the update identifier in the local version of the manifest is newer than the update identifier in the server version of the manifest.

11. A system for replicating protected data, the system comprising:
at least one computing device including:
a system for obtaining a local version of a manifest for a set of protected data items, the manifest including an identifier for each protected data item and a corresponding update identifier associated with a version of the protected data item and further including a plurality of client identifiers and a corresponding replication identifier for each of the plurality of client identifiers, wherein each client identifier identifies a unique computing device on which the manifest is replicated and wherein the replication identifier is associated with a last replication of the manifest on the corresponding computing device;
a system for obtaining a server version of the manifest from a server; and
a system for replicating the set of protected data items using the local version of the manifest and the server version of the manifest, the system for replicating including a system for comparing the replication identifiers for each of the plurality of client identifiers in the local version and server version of the manifest to verify a validity of the server version of the manifest.

12. The system of claim 11, the system for replicating further including:
a system for determining when another client last updated the server version of the manifest;
a system for updating the replication identifier corresponding to a client identifier for a client in the local version of the manifest;
a system for protecting the manifest from an unauthorized modification; and
a system for providing the manifest for storage at the server.

13. The system of claim 11, the system for replicating further including:
a system for comparing an update identifier corresponding to a protected data item in the local version of the manifest to an update identifier corresponding to the protected data item in the server version of the manifest;
a system for obtaining a server version of the protected data item when the update identifier in the local version of the manifest is older than the update identifier in the server version of the manifest;
a system for comparing an update identifier in the obtained protected data item with the update identifier in the server version of the manifest; and
a system for updating a local version of the protected data item based on the server version of the protected data item.

14. The system of claim 11, the system for replicating further including:
a system for comparing an update identifier for a local protected data item to an update identifier in the server version of the manifest; and
a system for providing the local protected data item for storage at the server when the update identifier for the local protected data item is newer than the update identifier in the server version of the manifest.

15. A program product stored on a physical computer-readable storage medium, which when executed, enables a computer infrastructure to replicate protected data, the program product comprising computer program code for enabling the computer infrastructure to:
obtain a local version of a manifest for a set of protected data items, the manifest including an identifier for each protected data item and a corresponding update identifier for the protected data item and further including a plurality of client identifiers and a corresponding replication identifier associated with a version of each of the plurality of client identifiers, wherein each client identifier identifies a unique computing device on which the manifest is replicated and wherein the replication identifier is associated with a last replication of the manifest on the corresponding computing device;
obtain a server version of the manifest from a server; and
replicate the set of protected data items using the local version of the manifest and the server version of the manifest, wherein the replicating includes comparing the replication identifiers for each of the plurality of client identifiers in the local version and server version of the manifest to verify a validity of the server version of the manifest.

16. The program product of claim 15, the program product further comprising computer program code for enabling the computer infrastructure to:
determine when another client last updated the server version of the manifest;
update the replication identifier corresponding to a client identifier for a client in the local version of the manifest;
protect the manifest from an unauthorized modification; and
provide the manifest for storage at the server.

17. The program product of claim 15, the computer program code for enabling the computer infrastructure to replicate including computer program code for enabling the computer infrastructure to:
compare an update identifier corresponding to a protected data item in the local version of the manifest to an update identifier corresponding to the protected data item in the server version of the manifest;
obtain a server version of the protected data item when the update identifier in the local version of the manifest is older than the update identifier in the server version of the manifest;
compare an update identifier in the obtained protected data item with the update identifier in the server version of the manifest; and
update a local version of the protected data item based on the server version of the protected data item.

18. The program product of claim 15, the computer program code for enabling the computer infrastructure to replicate including computer program code for enabling the computer infrastructure to:
  compare an update identifier for a local protected data item to an update identifier in the server version of the manifest; and
  provide the local protected data item for storage at the server when the update identifier for the local protected data item is newer than the update identifier in the server version of the manifest.

19. A method of generating a system for replicating protected data, the method comprising:
  providing a computer infrastructure including at least one computing device operable to:
    obtain a local version of a manifest for a set of protected data items, the manifest including an identifier for each protected data item and a corresponding update identifier associated with a version of the protected data item and further including a plurality of client identifiers and a corresponding replication identifier for each of the plurality of client identifiers, wherein each client identifier identifies a unique computing device on which the manifest is replicated and wherein the replication identifier is associated with a last replication of the manifest on the corresponding computing device;
    obtain a server version of the manifest from a server; and
    replicate the set of protected data items using the local version of the manifest and the server version of the manifest, wherein the replicating includes comparing the replication identifiers for each of the plurality of client identifiers in the local version and server version of the manifest to verify a validity of the server version of the manifest.

20. The method of claim 2, wherein the updating, protecting and providing are performed each time the server version of the manifest is obtained regardless of whether any protected data is modified.

* * * * *